June 20, 1961 L. P. THOMAS, JR., ET AL 2,989,589

NOISE CANCELLING CIRCUIT FOR TELEVISION RECEIVERS

Filed June 11, 1959 2 Sheets-Sheet 1

INVENTORS
LUCIUS P. THOMAS, JR. & CLYDE W. HOYT
BY W. H. Sprouagle
ATTORNEY

INVENTORS
LUCIUS P. THOMAS, JR.
& CLYDE W. HOYT
BY
ATTORNEY

United States Patent Office 2,989,589

Patented June 20, 1961

2,989,589

NOISE CANCELLING CIRCUIT FOR TELEVISION RECEIVERS

Lucius P. Thomas, Jr., Woodcrest, and Clyde W. Hoyt, Pennsauken, N.J., assignors to Radio Corporation of America, a corporation of Delaware Filed June 11, 1959, Ser. No. 819,775

12 Claims. (Cl. 178—7.3)

This invention relates to noise cancelling circuits for television receivers, and more particularly to noise cancelling circuits for use in the synchronizing channel of a television receiver.

In order that the image represented by the signals received by a television receiver in the form of a video modulated, radio frequency carrier wave, be properly reproduced, it is necessary that the scanning circuits for the kinescope of the receiver be synchronized with the scanning circuits associated with the camera (or other pickup device) of the transmitter. This synchronization is accomplished by transmitting a synchronizing signal for both the horizontal and vertical scansions of the conventional television raster. One of the spurious effects which may cause a lack of synchronization between the receiver and the transmitter is the reception of noise by the receiver. Noise in the synchronizing channel may supply false information to the synchronizing circuits and cause incorrect scanning. Various methods have been proposed for eliminating the noise in the synchronizing channel, such as amplitude clipping of the noise or by opposite polarity cancellation of the noise. Care must be taken to provide that the noise reducing circuits be reliable and efficient in the reduction of undesired noise, yet not adversely affect the synchronizing portions of the video signal.

It is an object of this invention to provide an improved noise reducing circuit for the synchronizing channel of a television receiver.

It is another object of this invention to provide an improved noise cancelling circuit for the synchronizing channel of a television receiver which is effective under varying conditions of signal strength.

It is a further object of this invention to provide an improved noise cancelling circuit for the synchronizing channel of a television receiver which cancels a large percentage of the noise in the channel.

It is yet another object of the invention to provide an improved noise cancelling circuit for the synchronizing channel of a television receiver which is economical of construction and reliable and efficient in operation.

These and other objects of the invention are accomplished, briefly, by providing a noise selector device that has a detected composite video signal applied thereto. The noise selector device is normally heavily conductive during all conditions of video signal with the exception of noise signals which exceed the peak amplitude of the synchronizing signal and are in such polarity as to reduce the conduction of the noise selector device. The noise signals thus will provide an output signal from the noise selector device, which is applied to a noise amplifier device that is normally nonconductive. The noise amplifier device amplifies the noise signals, which are then used to cancel noise signals in the composite video signal applied to the synchronizing signal separator circuit.

A further feature of the invention is that the noise amplifier device may be an electron tube with noise signals from the noise selector device applied to its control grid and with the full video signal applied to its cathode to provide a larger noise cancelling signal and more effective cancellation of the noise in the signal separator channel. Other features include the change of bias on the noise selector device under certain conditions to cancel small amplitude noise close to the tips of the synchronizing signal, which is not normally passed by the noise selector device; and, if electron tubes are used as the noise selector and noise amplifier, the inclusion of both noise processing tubes within the same tube envelope to prolong the tube life. Also, the bias voltage on the noise amplifier device may be altered under strong signal conditions to prevent cancellation of the synchronizing signals; and the noise amplifier device may also be connected with the automatic gain control circuits of the receiver in such a manner as to prevent the generation of a false automatic gain control voltage by noise signals.

The invention may be better understood, however, when the following detailed description is read in connection with the accompanying drawing, in which like reference numerals refer to corresponding parts throughout the various figures of the drawing and in which:

FIGURE 3 is a schematic circuit diagram of a portion of the circuit shown in FIGURE 2 illustrating a further modification.

Figures 1, 2:
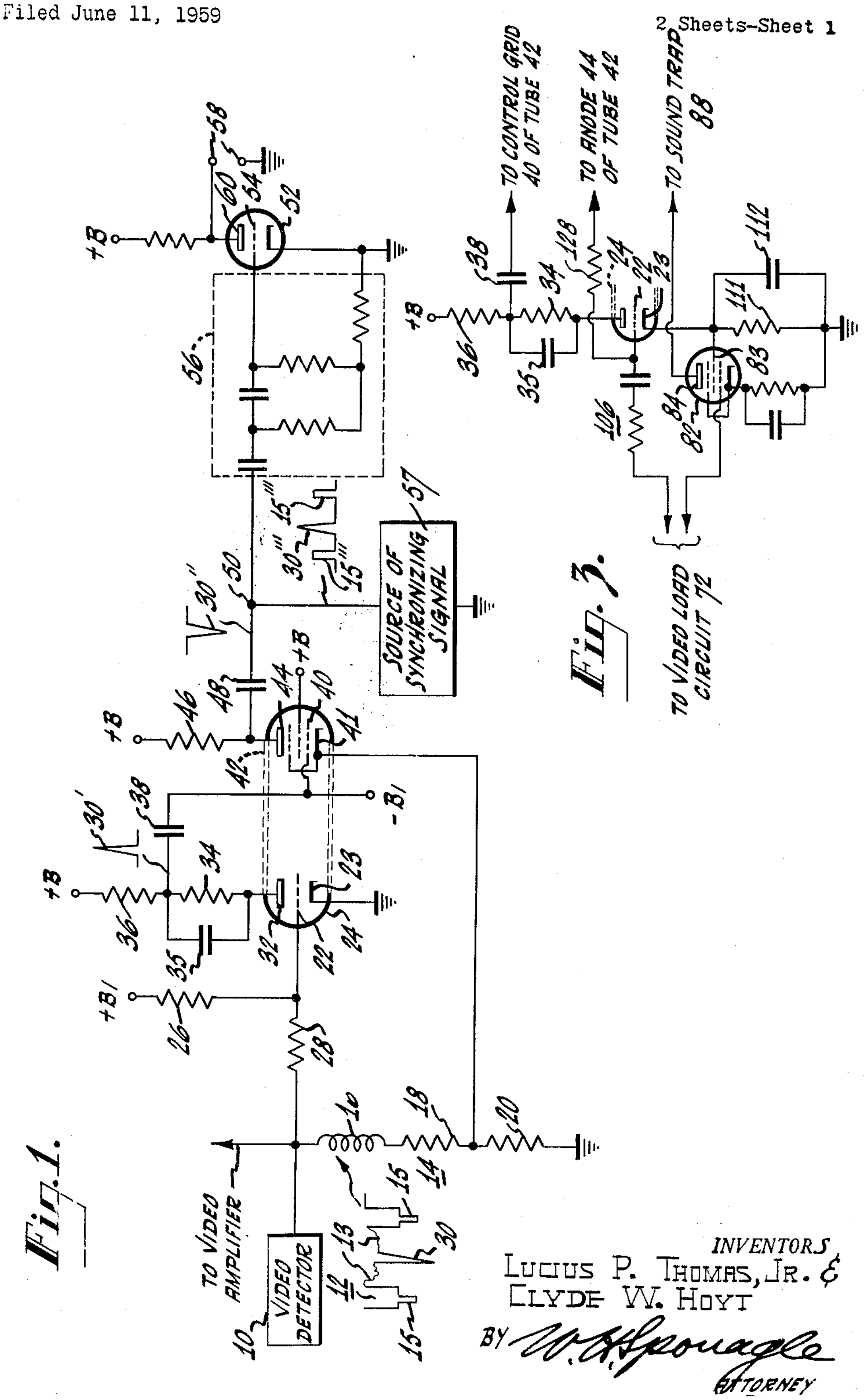
FIGURE 1 is a schematic circuit diagram of a portion of a television receiver illustrating the basic operational characteristics of the invention.
FIGURE 2 is a schematic circuit diagram of a television receiver having a noise cancelling circuit in accordance with the invention.
Figure 2:
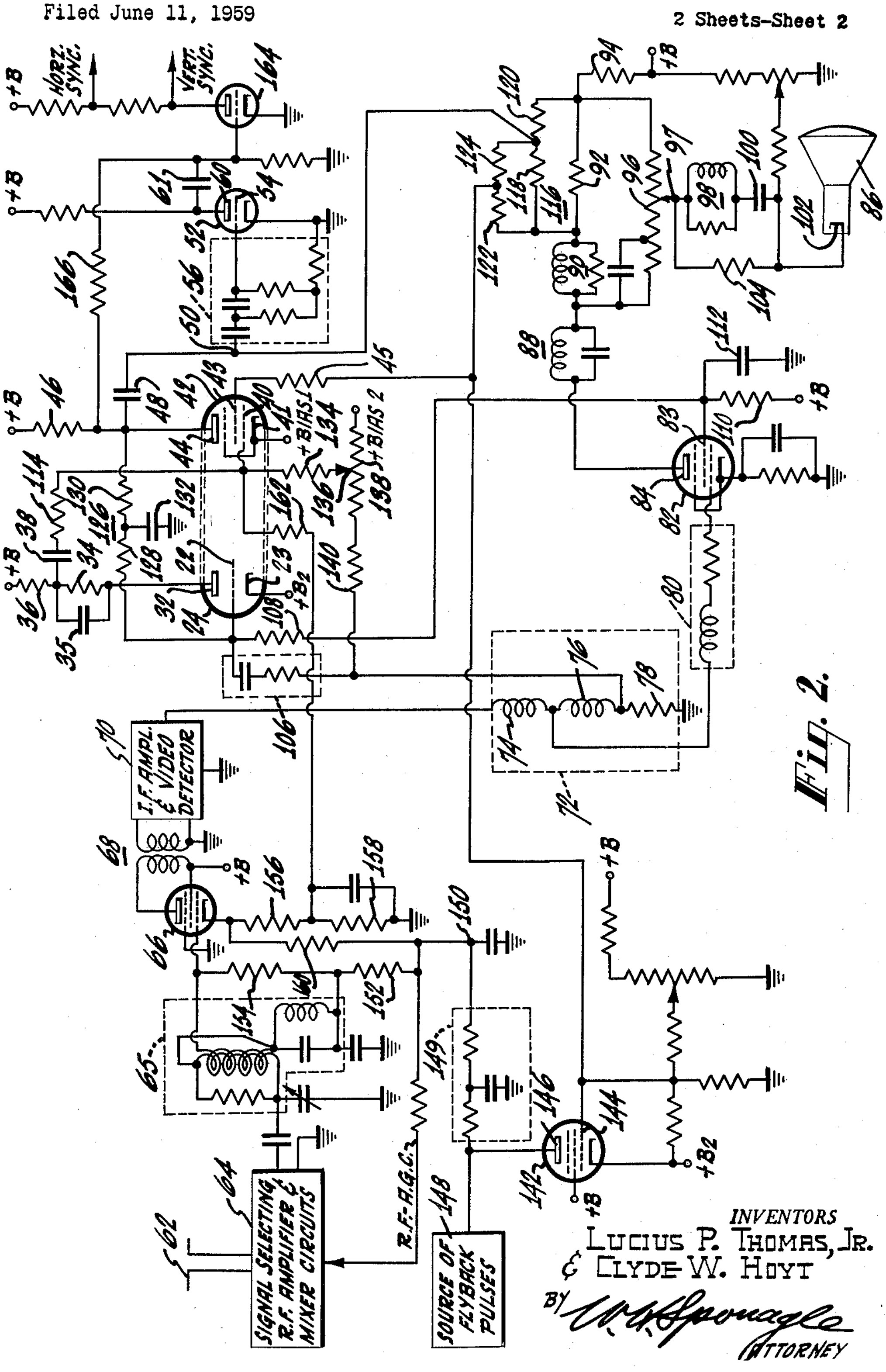

Referring now to FIGURE 1 of the drawing, a video detector 10, such as is conventional in present day television receivers, supplies a video signal wave, which has been schematically illustrated on the drawing as waveform 12, that includes a video information component 13, blanking and synchronizing signals 15, and which may include spurious noise signals 30. The video wave 12 is developed across a video load circuit 14, which includes a series connected high frequency peaking coil 16 and first and second load resistors 18, 20. As indicated, the video signal 12, appearing across the video load circuit 14, has the synchronizing signals 15 extending in the negative going direction with respect to common or ground connections conventionally indicated. The video signal wave 12 is applied, as in a manner widely used in television receivers, to a video amplifier (not shown) to provide energization of the kinescope (not shown). The video signal wave 12 is also applied from the video detector through an isolating resistor 28 to a noise cancelling circuit.

The noise cancelling circuit, in a simplified form, comprises a noise selector device 24 and a noise amplifier device 42 together with their associated circuitry. The noise selector and noise amplifier devices 24, 42 have been shown as a triode section and a pentode section, respectively, of a single vacuum tube. Operating voltage is supplied to the anode 32 of the noise selector tube section 24 from a source of operating voltage, +B, through a pair of serially connected noise selector load resistors 34, 36, with the resistor 34 being shunted by a capacitor 35. The cathode 23 of the noise selector tube section 24 is connected directly to ground for the receiver. A signal coupling capacitor 38 is connected between the junction point of the noise selector load resistors 34, 36 and the control grid 40 of the noise amplifier tube section 42. The anode 44 of the noise amplifier tube section 42 is supplied with operating voltage from the source of operating potential, +B, through a noise amplifier load resistor 46, and its cathode 41 is connected to ground through the second video detector load resistor 20.

More specifically, the video signal is applied to the control grid 22 of the noise selector tube section 24. The control grid 22 is biased by being connected through a bias resistor 26 to a source of positive potential, $+B_1$. The value of the voltage, $+B_1$, is selected so that the noise selector tube section 24 is normally heavily conductive for all values of the video signal less in amplitude than the synchronizing peaks. The bias is fixed beyond the peaks of the synchronizing signal so that no portion of the video signals, including the synchronzing peaks, will reduce conduction of the noise selector tube section 24. A noise signal, however, such as noise pulse 30 as indicated on the waveform 12, will reduce or cut off conduction in the noise selector tube section 24. This will cause the anode 32 to become more positive thus generating a positive noise signal 30′.

The positive noise signal 30′ is applied through the coupling capacitor 38 to the control grid 40 of the noise amplifier tube section 42, which is normally biased to cut-off by having its control grid 40 connected to a source of negative bias, −B. The positive noise signal 30′ on the control grid 40 drives the noise amplifier tube section 42 into conduction and a negative going noise signal 30″ appears at the anode 44. The negative going noise signal 30″ is applied through a coupling capacitor 48 to the terminal 50, which is the input terminal to a synchronizing signal separator circuit, which may be of known form. The terminal 50 is connected to the control grid 54 of a synchronizing signal separator tube 52 through a filter network 56.

Also applied to the point 50 are the synchronizing signals 15‴ of the video wave 12 which are derived from a local source of synchronizing signal 57 (to be described in more detail with reference to FIGURE 2). The output signal of the source of synchronizing signal 56 includes not only the synchronizing signal but a noise signal 30‴ resulting from the original noise signal 30 appearing in the video signal 12. It will be noted that the noise signal 30‴ is going in a positive direction, while the output noise signal 30″ of the noise amplifier tube section 42 is going in a negative direction. The noise signals 30″ and 30‴ are thus effectively cancelled at the terminal 50 before the synchronizing signals are applied to the synchronizing signal separator tube 52. Substantially noise free synchronizing signals are available at the output terminals 58 of the synchronizing signals separator tube 52, one of the output terminals 58 being connected directly to ground and the other being connected to the anode 60 of the synchronizing signal separator tube 52.

It will be noted that the cathode 41 of the noise amplifier tube section 42 is connected to the junction of the video detector load resistors 18, 20. This connection is optional and may be omitted if desired, but it may be utilized to provide that the noise amplifier tube section 42 is driven into heavy conduction on a noise signal, thus provding a large noise cancelling signal. The bias voltage, −B, on the control grid 40 is set so that the synchronizing signal peaks of the wave 12, alone, cannot drive the noise amplifier tube section 42 into conduction.

As is known, an electron tube which has heater voltage supplied may become defective after a time if plate current is not drawn through the tube. It will be noted that the triode and pentode 24, 42 are within the same tube envelope. Thus, one section of the tube is drawing plate current nearly all the time and is only cut off during noise peaks. This mode of operation tends to increase the life of the two vacuum tube sections 24 and 42. It is not necessary, of course, that the triode 24 and pentode 42 be within the same envelope, but it is desirable that a normally nonconducting tube section be within the same envelope with a normally conducting tube section.

It will be noted that, in the embodiment of the invention shown in FIGURE 1, the bias for the noise selector tube section 24 is fixed, and only noise that exceeds the peaks of the synchronizing signal by a predetermined amount, as fixed by the voltage $+B_1$, will cause noise cancellation. The television receiver circuit shown in FIGURE 2 shows, inter alia, additional circuitry which changes the bias on the control grid 22 of the noise selector tube section 24, after a large noise peak, to more effectively cancel the smaller noise peaks that would not normally overcome the relatively fixed bias. In addition, other features are shown in FIGURE 2 which will be more fully explained hereinafter.

The television receiver schematically shown in FIGURE 2 includes an antenna 62 to intercept and supply a radio frequency television signal to the signal selecting, radio frequency (RF) amplifier and mixer circuits 64. An intermediate frequency (IF) signal, corresponding to the received radio frequency signal, is supplied by the circuit 64 and applied through a bifilar T trap 65, such as described in an article by Jack Avins in the July 1954 issue of the Transactions of the IRE, Professional Group on Broadcast and Television Receivers, entitled "The Design of IF Amplifiers for Color Television Receivers," to the control grid of an intermediate frequency (IF) amplifier tube 66. The IF signal is amplified and applied through the transformer 68 to a further IF amplifier and video detector 70. The IF signal is detected to form a negative going video signal, including the synchronizing signals, which is developed across a video load circuit 72, which comprises first and second high frequency peaking coils 74, 76 connected in series with a video load resistor 78.

The video signal is applied from the junction of the first and second peaking coils 74, 76 through an inductor-resistor combination 80 to the control grid of a video amplifier tube 82 where it is amplified and applied across the video amplifier load circuit. The video amplifier load circuit comprises, basically, a sound trap 88 (to provide a high impedance to the intercarrier sound signal), a high frequency peaking circuit 90, and first and second video load resistors 92, 94 connected between the video amplifier anode 84 and the source of operating potential, +B. A contrast control potentiometer 96 is connected between the junction of the sound trap 88 and the high frequency peaking circuit 90 and the junction of the first and second video load resistors 92, 94. The video signal appearing across the contrast control 96 is applied through the variable tap 97 on the potentiometer 96 and a second high frequency peaking circuit 98 in series with a coupling capacitor 100 to the cathode 102 of the kinescope 86. A resistor 104 is also connected directly between the tap 97 and the kinescope cathode 102 to supply the direct voltage level of the video signal to the kinescope cathode 102. The intercarrier sound signal may be derived from the anode 84 of the video amplifier tube 82, but the circuitry for so deriving this signal has not been illustrated, since it may be of a known form and forms no part of the invention.

Thus, the radio frequency signal which is received by the antenna 62 is processed through the receiver and applied to the cathode 102 of the kinescope 86 to provide modulation in the intensity of the kinescope electron beam in accordance with the video signal information. As is known, the beam of the kinescope is swept across the face thereof to form a television raster by deflection circuits which are controlled by the horizontal and vertical synchronizing signals. Since these deflection circuits may be entirely conventional, and form no part of the invention, they have not been illustrated.

The noise cancelling circuit of FIGURE 2 is basically the same as that described with reference to FIGURE 1, but utilizes certain modifications. The video signal that appears across the video detector load resistor 78 is applied through a resistor-capacitor network 106 to the control grid 22 of the noise selector tube section 24. In this instance, the noise selector tube section 24 is biased by connecting the control grid 22 through a bias resistor 108 to the screen grid 83 of the video amplifier tube 82, which is, in turn, supplied with operating voltage from the source of operating potential, +B, through a resistor 110 that is by-passed to ground by a capacitor 112. Note also that the cathode 23 of the noise selector tube section 24 is connected to a second source of operating potential, $+B_2$ (having a lower voltage than the first operating potential, $+B$), rather than to ground as in FIGURE 1. The noise selector tube section 24 is, as in FIGURE 1, biased to conduct heavily at all signal levels except those signal levels exceeding the peaks of the synchronizing signals by a predetermined amount. The noise voltages are selected by the noise selector tube section 24 as specified in the description of FIGURE 1, and applied through the coupling capacitor 38 and a coupling resistor 114 to the control grid 40 of the noise amplifier tube section 42. Note, here, that the cathode 41 of the noise amplifier tube section 42 does not have video signal applied thereto, as in FIGURE 1, but is connected to a source of operating bias, shown as +Bias 1. Amplified noise signals appearing at the anode 44 of the noise amplifier tube section 42 are coupled through the coupling capacitor 48 to the input terminal 50 of the synchronizing signal separator circuit.

The synchronizing signals together with the undesired noise signals are supplied to the input terminal 50 from a voltage divider network 116 connected across the first video load resistor 92 in the video amplifier load circuit. The voltage divider network 116 comprises a first and second voltage divider resistors 118 and 120 with a pair of auxiliary voltage dividing resistors 122 and 124 connected across the first voltage divider resistor 118. The synchronizing signal is supplied to the terminal 50 by connecting it to the junction of the first and second voltage divider resistors 118 and 120. Thus, noise signals in the video signal are applied in a positive direction from the video load circuit to the input terminal 50 and are effectively cancelled by the negative going noise applied to the terminal 50 from the anode 44 of the noise amplifier tube section 42. Substantially noise free synchronizing signals are available at the anode 60 of the separator tube 52 and are applied through coupling capacitor 61 to the control grid of a synchronizing signal amplifier tube 164. The vertical and horizontal synchronizing signals may be derived from the anode circuit of the tube 164, as indicated, in a known manner.

The anode 44 of the noise amplifier tube section 42 is connected through a feedback network 126 to the control grid 22 of the noise selector tube section 24. The feedback network comprises a pair of feedback resistors 128 and 130 connected in series between the anode 44 and control grid 22, and a bypass capacitor 132 is connected between the junction of these resistors and ground. The purpose of this feedback network is to momentarily alter the bias on the control grid 22 of the noise selector tube section 24 in response to the changes in the anode voltage of the noise amplifier tube section so that low amplitude noise which does not normally exceed the fixed bias will cause the noise selector tube section 24 to reduce its current and provide a noise cancelling signal in the described manner at the input terminal 50 at the synchronizing signal separator tube 52. It will be apparent that this change in the bias of the noise selector tube section 22 will occur only following high noise peaks which exceed the fixed bias and causes the voltage on the anode 44 of the noise amplifier tube section 42 to drop. The net effect is that low amplitude noise signals, which are not normally cancelled, will be effectively cancelled following a high amplitude noise signal by the circuit and result in improved noise immunity.

A threshold bias for the noise amplifier tube section 42 is provided by connecting the control grid 40 through an isolating resistor 134 to the variable tap 136 of potentiometer 138, one end of the potentiometer 138 being connected to a source of positive bias, indicated as +Bias 2, and the other end being connected through a limit resistor 140 to a less positive, or negative, point, such as the junction of the second high frequency peaking coil 76 and the video load resistor 78 in the video detector load circuit 72. Adjustment of variable tap 136 allows the threshold level for noise cancelling to be manually adjusted by varying the voltage which will cause conduction in the noise amplifier tube section 42.

Turning now to another feature of the invention, the television receiver is supplied with automatic gain control (AGC) voltage which is developed by an automatic gain control (AGC) tube 142, which is illustrated as a pentode type tube. Signal for the AGC tube 142 is supplied from the junction of the auxiliary voltage dividing resistors 122 and 124 in the video amplifier anode circuit directly to the control grid 144 of the AGC tube 142. Keyed AGC is utilized and the anode 146 of the AGC tube 142 is thus supplied with flyback pulses (available in a conventional television receiver) from a source of flyback pulses 148 in a known manner. Thus, an AGC voltage will be developed at the anode 146 of the AGC tube 142 varying in amplitude in accordance with the amplitude of the synchronizing component of the video signal which is supplied to the control grid 144. The AGC voltage is applied to an AGC output terminal 150 through a filter circuit 149.

AGC voltage is supplied from the AGC output terminal 150 to the first IF amplifier tube 66 through a pair of resistors 152 and 154 connected directly between the point 150 and the control grid of the IF amplifier tube 66. The cathode circuit of the IF amplifier tube 66 includes a pair of serially connected resistors 156 and 158 connected directly between its cathode and ground. Since the IF amplifier tube 66 is operated Class A, a direct voltage appears across the resistors 156 and 158 and is utilized as a hold-off voltage for the RF amplifier. AGC voltage is applied to the radio frequency amplifier stages of the receiver through a resistor connected between the AGC output terminal 150 and the RF amplifier, but the AGC voltage must exceed the RF hold-off voltage before the AGC voltage is effective. The hold-off voltage is supplied to the AGC circuit by connecting the cathode of the IF amplifier tube 66 to the AGC output terminal 150 through a resistor 160. As far as described, the AGC circuit is known. It will be noted, however, that the screen grid 43 of the noise amplifier tube or pentode 42 is direct coupled to the grid 144 of the AGC tube 142 through a resistor 45. Noise signals appearing in the noise amplifier or pentode 42 are developed on the screen electrode 43 as well as at the anode 44 and are thus applied to the AGC tube grid 144 to cancel any noise voltages applied to the grid 144 from the video amplifier load circuit, tending to prevent the generation of an incorrect AGC voltage due to noise signals.

In order to perform its function of maintaining a relatively constant amplitude of detected video signal, the AGC circuit automatically varies the bias condition of the IF amplifier tube 66. As the AGC voltage goes more negative, less average current will flow through the tube 66. Thus, the voltage across the resistor 158 in the cathode circuit of the IF amplifier tube 66 will decrease in positive value with an increase in negative value of the AGC voltage. The voltage appearing across the cathode resistor 158 is connected through in isolating resistor 162 to the control grid 40 of the noise amplifier tube section 22 to vary its bias. This connection is provided so that, as the signal strength increases (indicated by an increase in AGC voltage in the negative direction), the control grid 40 of the noise amplifier tube section 42 will be rendered less positive, and a larger noise pulse will be required to cause conduction. A tracking voltage is thus provided between the noise cancelling circuit and the signal strength of the received radio frequency signal to insure that the synchronizing signal will not be cancelled by the noise cancelling circuit at high signal levels.

It will be noted also that the direct voltage on the anode of the noise amplifier tube section 42 is applied to the control grid of the synchronizing signal amplifier tube 164 through a large isolating resistor 166. This connection lowers the direct voltage on the grid of the synchronizing signal amplifier tube 164 to allow it to pass a larger amplitude of synchronizing signal during conditions of high noise than during normal signal conditions.

A further modification of the circuit in FIGURE 2 is shown in FIGURE 3. FIGURE 3 illustrates only that portion of the circuit shown in FIGURE 2 which has been modified. In particular, the cathode 23 of the noise selector tube section 24 is connected to the screen grid 83 of the video amplifier tube 82, and the screen grid 83 is connected to ground through a resistor 111 (shunted by capacitor 112), rather than to the source of operating voltage, +B, as in FIGURE 2. Connected in this fashion, the noise selector tube section 24 serves as a direct current dropping resistor from +B for the voltage applied to the screen grid 83 of the video amplifier tube 82. Noise pulses, which are applied in the manner described, to the control grid 22 of the noise selector tube section 24 reduce its conduction and increase its impedance. This action lowers the voltage on the video screen grid 83 and provides noise clipping of the peaks of noise signals in the video amplifier to a greater extent than in the video amplifier shown in FIGURE 2. This action, of course, aids in the noise reduction action in the synchronizing signal separator circuit.

A practical circuit constructed in accordance with the invention utilizes the circuit shown in FIGURE 2, and provdes excellent noise immunity under conditions of varying signal-to-noise conditions. Typical circuit components and values are as follows:

| | |
|---|---|
| Noise tubes **24** and **42** | Type 6EA8 (dual tube). |
| Video amplifier tube **82** and synchronizing signal separator tube **52** | Type 6EB8 (dual tube). |
| IF amplifier tube **66** | Type 6BZ6. |
| AGC tube **142** and synchronizing signal amplifier tube **164** | Type 6EA8 (dual tube). |
| Resistor: | |
| **34** | 10,000Ω. |
| **36** | 3,300Ω. |
| **45** | 1,000Ω. |
| **46** | 120,000Ω. |
| **78** | 3,900Ω. |
| **92** | 6,800Ω. |
| **94** | 1,800Ω. |
| **96** | 30,000Ω. |
| **104** | 1,000,000Ω. |
| **108** | 470,000Ω. |
| **110** | 18,000Ω. |
| **114** | 56,000Ω. |
| **118** | 100,000Ω. |
| **120** | 39,000Ω. |
| **122** | 47,000Ω. |
| **124** | 82,000Ω. |
| **128** | 680,000Ω. |
| **130** | 820,000Ω. |
| **134** | 1,000,000Ω. |
| **138** | 2,000,000Ω. |
| **140** | 220,000Ω. |
| **152** | 1,000Ω. |
| **154** | 4,700Ω. |
| **156** | 68Ω. |
| **158** | 1,200Ω. |
| **160** | 120,000Ω. |
| **166** | 1,000,000Ω. |
| Capacitor: | |
| **35** | 0.22 μf. |
| **38** | 0.047 μf. |
| **48** | 0.22 μf. |
| **61** | 0.033 μf. |
| **100** | 0.22 μf. |
| **112** | 10.0 μf. |

| | |
|---|---|
| Peaking Coil: | |
| **74** | 36 μf. |
| **76** | 250 μf. |
| Peaking Circuit: | |
| **90** | 10,000Ω shunted by 750 μf. |
| **98** | 6,800Ω shunted by 300 μf. |
| Inductor-resistor **80** | 2.7 μf. in series with 330Ω. |
| Resistor-capacitor **106** | 39,000Ω in series with 0.22 μf. |

Having described the invention, what is claimed is:

1. A noise cancelling circuit for a television receiver, said receiver having a source of video signal having synchronizing signal components of a given polarity and which may include spurious noise signals of the same polarity, comprising in combination: a normally conductive noise selector tube having an anode, cathode, and control grid; means for applying said video signal between the cathode and control grid of said selector tube so that only noise signal peaks exceeding the amplitude of the synchronizing signal component of the video signal cause reduced conduction of said tube; means for deriving an output signal from the anode of said selector tube; a normally non-conductive noise amplifier tube having an anode, a cathode, and a control grid; signal coupling means connecting the anode of said selector tube with the control grid of said amplifier tube; a synchronizing signal separator circuit having an input circuit; means for applying said video signal to the input circuit of said synchronizing signal separator circuit with the synchronizing signal and noise components of one polarity; and signal coupling means connected between the anode of said amplifier tube and the input circuit of said separator circuit for applying to said synchronizing signal separator circuit a noise output signal from said noise amplifier tube having a polarity opposite to said one polarity.

2. A noise cancelling circuit for a television receiver, said receiver having a signal source providing a video signal having synchronizing signal components of a given polarity and which may include spurious noise signals of the same polarity, comprising in combination: a noise selector tube having an anode, cathode, and control grid; means connected between the control grid and the cathode of said selector tube to render said tube normally conductive; means for applying said video signal between the cathode and control grid of said noise selector tube so that only noise signal peaks exceeding the amplitude of the synchronizing signal component of the video signal cause reduced conduction of said tube; means for deriving an output signal from the anode of said noise selector tube; a noise amplifier tube having an anode, a cathode, and a control grid; means connected between the control grid and cathod of said amplifier tube to render said tube normally non-conductive; signal coupling means connecting the anode of said selector tube with the control grid of said amplifier tube for causing said amplifier tube to conduct in response to noise signals on the anode of said selector tube; a synchronization signal separator circuit having an input circuit means for applying said video signal including noise signals to the input circuit of said separator circuit; signal coupling means connected between the anode of said amplifier tube and said input circuit of said separator circuit for applying a noise output signal from said noise amplifier tube having a polarity opposite to the polarity of said noise signals of the video signal applied to the input circuit of said separator circuit.

3. A noise cancelling circuit for a television receiver, said receiver including a source of video signal having synchronizing signal components of a given polarity and which may include spurious noise signals of the same polarity, comprising in combination: a normally conductive noise selector tube having an anode, cathode, and control grid; means for applying said video signal between the cathode and control grid of said noise selector tube such that only noise signal peaks exceeding the amplitude of the synchronizing signal component of the video signal cause reduced conduction of said tube; means for deriving an output signal from the anode of said first noise amplifier tube; a normally non-conductive noise ampilfier tube having an anode, a cathode, and a control grid; signal coupling means connecting the anode of said first tube with the control grid of said second tube; a synchronizing signal separator circuit having an input circuit means for applying said video signal to the input circuit of said synchronizing signal separator circuit with the synchronizing components of one polarity; signal coupling means connected between the anode of said amplifier tube and the input circuit of said separator circuit for applying to said separator circuit a noise output signal from said second noise amplifier tube having a polarity opposite to said one polarity; and feedback means connected between said noise amplifier tube and said noise selector tube for momentarily reducing the amplitude of noise signal required to reduce conduction of said noise selector tube in response to a noise output signal from said noise amplifier tube.

4. A noise cancelling circuit for a television receiver, said receiver having a signal source providing a video signal having synchronizing signal components of a given polarity and which may include spurious noise signals of the same polarity, comprising in combination: a noise selector tube; biasing means connected to said selector tube to render said tube normally conductive; means for applying said video signal to said noise selector tube so that only noise signal peaks exceeding the amplitude of the synchronizing signal component of the video signal cause reduced conduction of said tube; means for deriving an output signal from said noise selector tube; a noise amplifier tube; further biasing means connected to said amplifier tube to render said amplifier tube normally nonconductive; signal coupling means connecting said selector tube and said amplifier tube for causing said amplifier tube to conduct in response to output noise signals from said selector tube; a synchronizing signal separator circuit having an input circuit, means for applying said video signal including noise signals to the input circuit of said separator circuit; signal coupling means connected between said amplifier tube and the input circuit of said separator circuit for applying a noise output signal from said noise amplifier tube to said separator circuit having a polarity opposite to the polarity of noise signals of the video signal applied to said separator circuit; and feedback means connected between said noise amplifier tube and said selector tube to momentarily reduce the amplitude of noise signals required to reduce conduction of said selector tube in response to a noise output signal from said noise amplifier tube.

5. In a television receiver having an intermediate frequency amplifier for amplifying an intermediate frequency signal and developing a video signal including synchronizing signal components and which may include spurious noise signals, a synchronizing signal separator circuit having a signal input circuit, and an automatic gain control circuit having an output circuit for developing an automatic gain control voltage in response to the strength of said intermediate frequency television signals, the combination comprising: a noise amplifier electron tube having an anode, a cathode, and a control grid; means connected between the cathode and control grid of said tube for biasing said tube into a normally non-conducting state; means for applying noise signals present in said video signal which exceed in amplitude the synchronizing component of the video signal to the control grid to cathode circuit of said tube to develop noise output signals at the anode of said tube; means for applying said video signal with the synchronizing components and noise signals extending in a given polarity to the input circuit of said synchronizing signal separator circuit; means for applying said noise output signals from the anode of said noise amplifier tube to the input circuit of said separator circuit having a polarity opposite to the polarity of said synchronizing and noise signals of said video signal; an intermediate frequency amplifier tube having at least cathode and a control grid in said intermediate frequency amplifier; means for applying said automatic gain control voltage to the control grid of said intermediate frequency amplifier tube; a cathode circuit connected to the cathode of said intermediate frequency amplifier tube across which is developed a direct voltage dependent upon the average value of the space current flowing through said intermediate frequency amplifier tube; and means for applying a portion of the voltage developed across said cathode circuit to the control grid of said noise amplifier tube to alter the bias on said noise amplifier tube in response to changes in the signal strength of the intermediate frequency television signal to prevent the amplification of synchronizing signals by said noise amplifier tube.

6. In a television receiver having an intermediate frequency amplifier for amplifying an intermediate frequency television signal, a video detector for detecting and developing a video signal including synchronizing signal components and which may include spurious noise signals, a synchronizing signal separator circuit having an input circuit, and an automatic gain control circuit having an output circuit for developing an automatic gain control voltage in response to the strength of said intermediate frequency television signals, the combination comprising: a noise amplifier electron tube; bias means connected with said tube for normally biasing said tube into a non-conducting state; means for applying noise signals present in said video signal which exceed in amplitude the synchronizing component of the video signal to said noise amplifier tube for developing noise output signals therefrom; means for applying said video signal with the synchronizing components and noise signals in a given direction to the input circuit of said synchronizing signal separator circuit; means for applying noise output signals from said noise amplifier tube to the input circuit of said separator circuit having a polarity opposite to the polarity of said synchronizing and noise signals of said video signal applied thereto; an intermediate frequency amplifier tube in said intermediate frequency amplifier; means for applying said automatic gain control voltage to said intermediate frequency amplifier tube; means connected with said intermediate frequency amplifier tube to develop a direct voltage dependent upon the average value of the space current in said intermediate frequency amplifier tube; and means for applying said direct voltage to said noise amplifier tube to alter the bias thereon in response to changes in the signal strength of the intermediate frequency television signal to prevent the amplification of synchronizing signals by said noise amplifier tube.

7. A noise cancelling circuit for a synchronizing signal separator circuit of a television receiver, said receiver having a signal source providing a video signal having synchronizing signal components of a given polarity and which may include spurious noise signals of the same polarity, said receiver further including an automatic gain control tube having an input electrode for applying said video signal thereto and an output electrode for developing an automatic gain control voltage, comprising in combination: a noise amplifier tube having an anode, a cathode, a control grid and a screen grid; biasing means connected between the cathode and control grid of said amplifier tube to render said tube normally nonconductive; means for applying only noise signal peaks exceeding the amplitude of the synchronizing signal component of the video signal to the control grid of said tube; means for deriving a noise output signal from the anode of said noise amplifier tube; direct current coupling means connected between said screen grid and the input electrode of said automatic gain control tube for applying noise output signals and the direct potential of said screen grid to the input electrode of said automatic gain control tube in a polarity opposite to the polarity of said noise signals of the video signal applied thereto.

8. A noise cancelling circuit for a television receiver, said receiver including a synchronizing signal separator circuit having an input circuit, said receiver also having a signal source providing a video signal having synchronizing signal components of a given polarity and which may include spurious noise signals of the same polarity, said receiver further having an automatic gain control circuit for developing an automatic gain control voltage in response to the strength of said video signal, comprising in combination: a noise selector tube; biasing means connected to said selector tube to render said tube normally conductive; means for applying said video signal to said noise selector tube such that only noise signal peaks exceeding the amplitude of the synchronizing signal component of the video signal cause reduced conduction of said tube; means for deriving an output signal of said noise selector tube; a noise amplifier tube; further biasing means connected to said amplifier tube to render said tube normally nonconductive; signal coupling means connecting said selector tube and said amplifier tube for causing said amplifier tube to conduct in response to noise output signals from said selector tube; means for applying said video signal including noise signals to the input circuit of said separator circuit; signal coupling means connected between said amplifier tube and the input circuit of said separator circuit for applying a noise output signal from said noise amplifier tube having a polarity opposite to the polarity of noise signals of the video signal applied to said separator circuit, and signal coupling means connected between said noise amplifier tube and said automatic gain control circuit for applying noise signals developed in said amplifier tube to said automatic gain control circuit in such polarity as to prevent said automatic gain control circuit from developing automatic gain control voltage in response to noise signals in said video signal.

9. In a television receiver having an intermediate frequency amplifier for amplifying an intermediate frequency television signal, a video detector for detecting the intermediate frequency signal and developing a video signal including synchronizing signal components and which may include spurious noise signals, and an automatic gain control circuit having an output circuit and a signal input circuit for developing an automatic gain control voltage in response to said video signal applied to the signal input circuit thereof, the combination comprising: a noise selector electron tube having an anode, a cathode, and a control grid; biasing means connected between the control grid and cathode of said selector tube for rendering said tube normally conductive; means for applying said video signal between the control grid and cathode of said selector tube such that only noise signals in said video signal which exceed the amplitude of the synchronizing component of said video signal cause reduced conduction of said selector tube; a noise amplifier electron tube having an anode, a cathode, and a control grid; means connected between the cathode and control grid of said noise amplifier tube for biasing said tube into a normally nonconducting state; means for applying output signals from the anode of said noise selector tube to the control grid of said noise amplifier tube for deriving a noise output signal from the anode of said noise amplifier tube; a synchronizing signal separator circuit having a signal input circuit; means for applying said video signal with the synchronizing components and noise signals extending in a given polarity to the input circuit of said synchronizing signal separator circuit; means for applying said noise output signals from the anode of said noise amplifier tube to the input circuit of said separator circuit having a polarity opposite to the polarity of said synchronizing and noise signals of said video signal; feedback means connected between the anode of said noise amplifier tube and the control grid of said noise selector tube for momentarily reducing the amplitude of noise signal required to reduce conduction in said noise selector tube; an intermediate frequency amplifier tube having at least cathode and a control grid in said intermediate frequency amplifier; means for applying said automatic gain control voltage to the control grid of said intermediate frequency amplifier tube; a cathode circuit connected to the cathode of said intermediate frequency amplifier tube across which is developed a direct voltage dependent upon the average value of the space current flowing through said intermediate frequency amplifier tube; and means for applying a portion of the voltage developed across said cathode circuit to the control grid of said noise amplifier tube to alter the bias on said noise amplifier tube in response to changes in the signal strength of said video signal to prevent the amplification of synchronizing signals by said noise amplifier tube.

10. A noise cancelling circuit as defined in claim 9 wherein said synchronizing signal separator circuit includes a synchronizing signal separator electron tube and a synchronizing signal amplifier tube, and direct current coupling means connected between the anode of said noise amplifier electron tube and said synchronizing signal amplifier tube in such polarity as to increase the amplitude of synchronizing signal output from said synchronizing signal separator circuit in the presence of noise signals on the anode of said noise amplifier electron tube.

11. In a television receiver having an intermediate frequency amplifier for amplifying an intermediate frequency television signal, a video detector for developing a video signal from said intermediate frequency signal including synchronizing signal components and which may include spurious noise signals, a synchronizing signal separator circuit having an input circuit, and an automatic gain control circuit for developing an automatic gain control voltage in response to the strength of said video signal, the combination comprising: a noise selector tube; biasing means connected to said selector tube for rendering said tube normally conductive; means for applying said video signal to said selector tube such that only noise signals in said video signal which exceed the amplitude of the synchronizing component of said video signal cause reduced conduction of said selector tube; a noise amplifier electron tube; means connected to said noise amplifier tube for biasing said tube into a normally non-conducting state; means for applying output signals from said noise selector tube to said noise amplifier tube for deriving a noise output signal from said noise amplifier tube; means for applying said video signal with the synchronizing components and noise signals extending in a given polarity to the input circuit of said synchronizing signal separator circuit; means for applying said noise output signals from said noise amplifier tube to the input circuit of said separator circuit having a polarity opposite to the polarity of said synchronizing and noise signals of said video signal; feedback means connected between said noise amplifier tube and said noise selector tube for momentarily reducing the amplitude of noise signals required to reduce conduction in said noise selector tube in response to a noise output signal from said noise amplifier tube; an intermediate frequency amplifier tube in said intermediate frequency amplifier; means for applying said automatic gain control voltage to said intermediate frequency amplifier tube; means connected to said intermediate frequency amplifier tube for deriving a direct voltage dependent upon the average value of the space current flowing through said intermediate frequency amplifier tube; and means for applying a portion of said direct voltage to said noise amplifier tube to alter the bias on said noise amplifier tube in response to changes of said direct voltage to prevent the amplification of synchronizing signals by said noise amplifier tube.

12. A noise cancelling circuit for a television receiver, said receiver having a synchronizing signal separator circuit including an input circuit, said receiver also including a source of video signal having synchronizing components of a given polarity and which may include spurious noise signals of the same polarity comprising: a noise selector device having an input circuit and an output circuit; means for biasing said noise selector device to be normally conductive in the absence of noise signals; means for applying said video signal to the input circuit of said noise selector device such that only noise signal peaks exceeding the amplitude of the synchronizing component of the video signal cause reduction in the conduction of said device; means for deriving an output signal from the output circuit of said noise selector device; a noise amplifier device having an input circuit and an output circuit, means for applying the output signal of said noise selector amplifier device to the input circuit of said noise amplifier device; means for applying said video signal to the input circuit of said synchronizing signal separator circuit with the synchronizing signal and noise components extending in a given polarity; and signal coupling means connected between the output circuit of said noise amplifier device and the input circuit of said signal separator circuit for applying a noise output signal from said noise amplifier device having a polarity opposite to the polarity of the synchronizing signal and noise components of the video signal applied to said synchronizing signal separator circuit for cancelling the noise components of said video signal.

References Cited in the file of this patent

UNITED STATES PATENTS

| | | |
|---|---|---|
| 2,797,259 | Thomas | Jan. 25, 1957 |
| 2,803,700 | Kroger | Aug. 20, 1957 |